(12) United States Patent
Morselli

(10) Patent No.: US 11,479,255 B2
(45) Date of Patent: Oct. 25, 2022

(54) TRANSMISSION UNIT FOR AN ELECTRIC VEHICLE AND CONTROL METHOD

(71) Applicant: Dana Motion Systems Italia S.R.L., Reggio Emilia (IT)

(72) Inventor: Riccardo Morselli, Piandelagotti (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 17/341,144

(22) Filed: Jun. 7, 2021

(65) Prior Publication Data
US 2021/0380114 A1 Dec. 9, 2021

(30) Foreign Application Priority Data

Jun. 8, 2020 (DE) ..................... 10 2020 207 168.3

(51) Int. Cl.
*B60W 30/19* (2012.01)
*B60W 10/08* (2006.01)
*B60W 10/11* (2012.01)

(52) U.S. Cl.
CPC ............ *B60W 30/19* (2013.01); *B60W 10/08* (2013.01); *B60W 10/11* (2013.01); *B60W 2510/083* (2013.01); *B60W 2710/083* (2013.01)

(58) Field of Classification Search
CPC ...... B60W 30/19; B60W 10/08; B60W 10/11; B60W 2510/083; B60W 2710/083; B60K 17/12; B60L 50/50; F16H 2200/021
See application file for complete search history.

(56) References Cited

U.S. PATENT DOCUMENTS

2019/0131851 A1\* 5/2019 Herb ........................ H02K 9/19
2019/0283612 A1\* 9/2019 Morita ...................... B60L 9/18

FOREIGN PATENT DOCUMENTS

| DE | 102018222251 A1 \* | 6/2020 |
| DE | 102019209985 A1 \* | 1/2021 |
| GB | 2578559 A \* | 5/2020 ............... B60K 1/02 |

\* cited by examiner

*Primary Examiner* — Richard W Ridley
*Assistant Examiner* — Aimee Tran Nguyen
(74) *Attorney, Agent, or Firm* — McCoy Russell LLP

(57) ABSTRACT

The present disclosure relates to a transmission unit for an electric vehicle and a control method for the transmission unit. The transmission unit comprises a transmission output shaft, a first electric motor having a first output shaft that can be coupled with the transmission output shaft via a first or a second gear set, wherein a first clutch element is arranged between the first gear set and the transmission output shaft and a second clutch element is arranged between the second gear set and the transmission output shaft, and a second electric motor having a second output shaft coupled with the transmission output shaft via a third gear set.

13 Claims, 9 Drawing Sheets

TRANSMISSION UNIT FOR AN ELECTRIC VEHICLE AND CONTROL METHOD

CROSS-REFERENCE TO RELATED APPLICATION

The present application claims priority to German Patent Application No. 10 2020 207 168.3, entitled "TRANSMISSION UNIT FOR AN ELECTRIC VEHICLE AND CONTROL METHOD," and filed on Jun. 8, 2020. The entire contents of the above-listed application are hereby incorporated by reference for all purposes.

TECHNICAL FIELD

The present disclosure relates to a transmission unit for an electric vehicle and a control method for performing a gear shift.

BACKGROUND AND SUMMARY

In manufacturing of compact electric vehicles a 48 V system for electric vehicles may be used. The performance of a single motor powertrain is then limited by the 48 V power supply and by the maximum current in the inverter.

An object of the present disclosure is therefore to provide a transmission unit for an electric vehicle and a control method which overcome the above mentioned issue and increase the efficiency of the powertrain of an electric vehicle.

A transmission unit for an electric vehicle according to the present disclosure comprises a transmission output shaft, a first electric motor having a first output shaft that can be coupled with the transmission output shaft via a first or a second gear set, wherein a first clutch element is arranged between the first gear set and the transmission output shaft and a second clutch element is arranged between the second gear set and the transmission output shaft, and a second electric motor having a second output shaft coupled with the transmission output shaft via a third gear set.

Thus, the present disclosure solves the above mentioned problem by providing a two-electric-motor transmission unit with an overall efficiency management by controlling the torques generated by the two electric motors. The transmission unit according to the present disclosure enables powershifting also without the use of complex and expensive clutches.

According to an advantageous embodiment of the present disclosure, the first to third gear sets all have different gear ratios.

According to an advantageous embodiment of the present disclosure, the first and second clutch elements comprise or consist of dog clutches or synchronizer clutches.

According to an advantageous embodiment of the present disclosure, the transmission unit further comprises a controller configured to control the first and second electric motors and to perform a gear shift, wherein the control unit is configured to synchronize the first or second electric motor with a next gear ratio and to engage or disengage the first or second clutch element when the first or second motor has been synchronized.

According to an advantageous embodiment of the present disclosure, the transmission unit further comprises a first angular position sensor to detect an angular position of the first electric motor, a second angular position sensor to detect an angular position of the second electric motor, wherein the controller is adapted to synchronize the first and second electric motors using the detected angular positions of the first and second electric motors.

According to an advantageous embodiment of the present disclosure, the controller is configured to control the first and second electric motors and the first and second clutch elements such that a transmission output torque of the transmission output shaft is basically constant during a gear shift.

According to an advantageous embodiment of the present disclosure, the first and second clutch elements are spring applicable and/or hydraulically releasable.

According to an advantageous embodiment of the present disclosure, the first and second clutch elements are simultaneously engageable to ensure a park lock feature.

According to an advantageous embodiment of the present disclosure, the first and second electric motors are connected to a common cooling system to share a thermal load produced during operation of the first and second electric motors.

According to an advantageous embodiment of the present disclosure, the first output shaft is engaged to the transmission output shaft via one or more further gear sets, wherein between each of the one or more further gear sets and the transmission output shaft a further clutch element is arranged.

According to an advantageous embodiment of the present disclosure, the first gear set, the second gear set and/or the one or more further gear sets comprises a planetary gear set.

The present disclosure further includes a control method for controlling a transmission unit according to one of the preceding claims to perform a gear shift from the first gear set to the second gear set, comprising: controlling the first electric motor to decrease a first torque to zero, controlling the second electric motor to increase a second torque to fully or partially compensate the decrease of the first torque, controlling the first clutch element to disengage from the first gear set when the first torque is zero, controlling the first electric motor to synchronize with a gear ratio of the second gear set, controlling the second clutch element to engage with the second gear set when the first electric motor has been synchronized, controlling the first electric motor to increase the first torque, and controlling the second electric motor to decrease the second torque.

According to an advantageous embodiment of the present disclosure, the second electric motor is controlled according to a vehicle speed reference.

According to an advantageous embodiment of the present disclosure, the first electric motor is controlled according to a torque reference or a position reference.

According to an advantageous embodiment of the present disclosure, an efficiency optimization for the speed-torque curves of the first and second motors takes a transmission efficiency into account.

In the following, some additional embodiments of the transmission unit and the control method according to the present disclosure are described in more detail on the basis of the following figures. The described features are not only conceivable in the combinations of the disclosed embodiments, but can be realized independently of the concrete embodiments in various other combinations.

DETAILED DESCRIPTION

Figure 1:
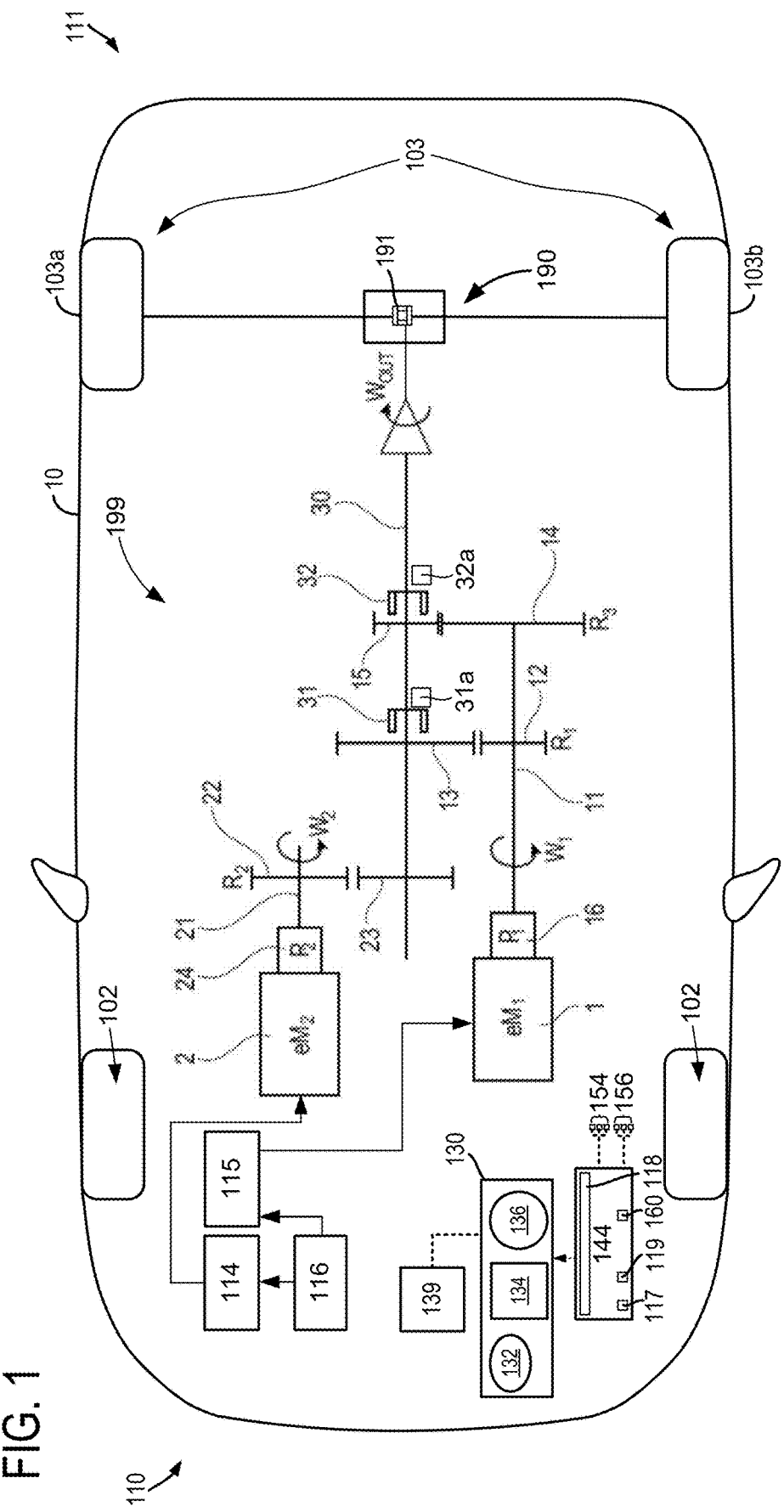
FIG. 1 shows a schematic representation of a transmission unit according to an embodiment of the disclosure.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 that may selectively provide propulsive effort to rear axle 190. Electric energy storage device 116 (e.g., a traction battery or capacitor) may provide electric power to and receive electric power from first electric motor 1 and second electric motor 2. Inverter 114 may convert direct current (DC) from electric energy storage device 116 to alternating current (AC). The AC may be supplied from inverter 114 to second electric motor 2. Alternatively, inverter 114 may convert AC from second electric motor 2 to DC that is supplied to electric energy storage device 116. Inverter 114 may convert direct current (DC) from electric energy storage device 116 to alternating current (AC). The AC may be supplied from inverter 114 to second electric motor 2. Alternatively, inverter 114 may convert AC from second electric motor 2 to DC that is supplied to electric energy storage device 116. Inverter 115 may convert direct current (DC) from electric energy storage device 126 to alternating current (AC). The AC may be supplied from inverter 115 to first electric motor 1. Alternatively, inverter 115 may convert AC from first electric motor 1 to DC that is supplied to electric energy storage device 116.

FIG. 1 also shows a schematic representation of a transmission unit according to an embodiment of the disclosure. The transmission unit comprises a transmission output shaft 30, a first electric motor 1 having a first output shaft 11 that can be coupled with the transmission output shaft 30 via a first or a second gear set 12, 13 and 14, 15. A first dog clutch 31 is arranged between the first gear set 12, 13 and the transmission output shaft 30 and a second dog clutch 32 is arranged between the second gear set 14, 15 and the transmission output shaft 30. The transmission unit further comprises a second electric motor 2 having a second output shaft 21 coupled with the transmission output shaft 30 via a third gear set 22, 23.

The second electric motor 2 rotates the second output shaft 21 with output speed W2 which is transmitted via the third gear set 22, 23 with gear ratio R2 to the transmission output shaft 30 contributing to the transmission output speed Wout. The first electric motor 1 rotates the first output shaft 11 with output speed W1 which can be selectively transmitted via the first gear set 12, 13 having gear ratio R1 by closing the first dog clutch 31 or via the second gear set 14, 15 having gear ratio R3 by closing the second dog clutch 32, thereby contributing to the transmission output speed Wout. Here, the gear ratios can be chosen such that R1>R2>=R3.

Furthermore, the first electric motor 1 comprises an angular position sensor 16 for detecting an angular position of the first motor 1. The second electric motor 2 comprises an angular position sensor 24 for detecting an angular position of the second motor 2. The first and second electric motors 1, 2 can be synchronized, which may be done before closing the first or second dog clutch 31, 32, using the detected angular positions of the first and second electric motors 1, 2.

Torque and power may be delivered from transmission output shaft 30 to rear axle 190. The rear axle 190 may be an integrated axle that includes a differential gear set 191. Differential gear set 191 may be open when vehicle 10 is traveling on roads and negotiating curves so that right rear wheel 103a may rotate at a different speed than left rear wheel 103b.

The vehicle 10 may include a controller 144 that may communicate with dash board 130, motor 1, motor 2, inverter 114, and inverter 115. Controller 144 includes read-only memory (ROM or non-transitory memory) 117, random access memory (RAM) 119, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to angular position sensor 24 and angular position sensor 16. Actuators 156 may include but are not limited to vehicle speed sensors, inverter 114, inverter 115, motor 2, motor 1, dog clutch actuator 31, and dog clutch actuator 32a.

Vehicle 10 may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 114 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as a key fob, that may be inserted into the operator interface 136 to activate the propulsion source 12 and to turn on the vehicle 10, or may be removed to shut down the propulsion source 12 and to turn off the vehicle. Other examples may include a key fob that is communicatively coupled to the operator interface 136. The key fob or a smart key that does not have to be inserted or removed from the interface 136 to operate the propulsion source 12. Still other examples may additionally or optionally use a start/stop button that is manually pressed by the operator to start or shut down motor 1 and motor 2.

Figure 2:
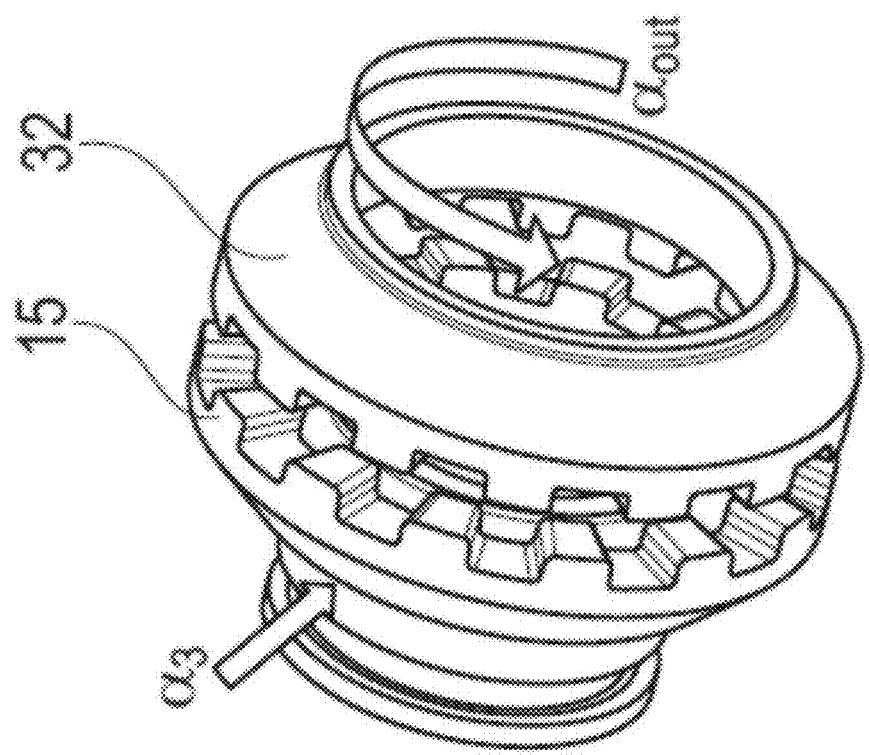
FIG. 2 shows a dog clutch mechanism.

FIG. 2 shows the dog clutch mechanism at the second gear set 14, 15. The angular position α3 of gear 15 can be determined and monitored using the first position sensor 16. The angular position αout of the second dog clutch element 32 which is rigidly connected to the transmission output shaft 30 can be determined and monitored using the second angular position sensor 24. When the first electric motor 1 is decoupled from the transmission output shaft 30, e.g. during a gear shift process, the first electric motor 1 can synchronize with the second dog clutch element 32 by controlling the angular position α3 of gear 15 in accordance with the angular position αout of the second dog clutch element 32.

Figure 9:
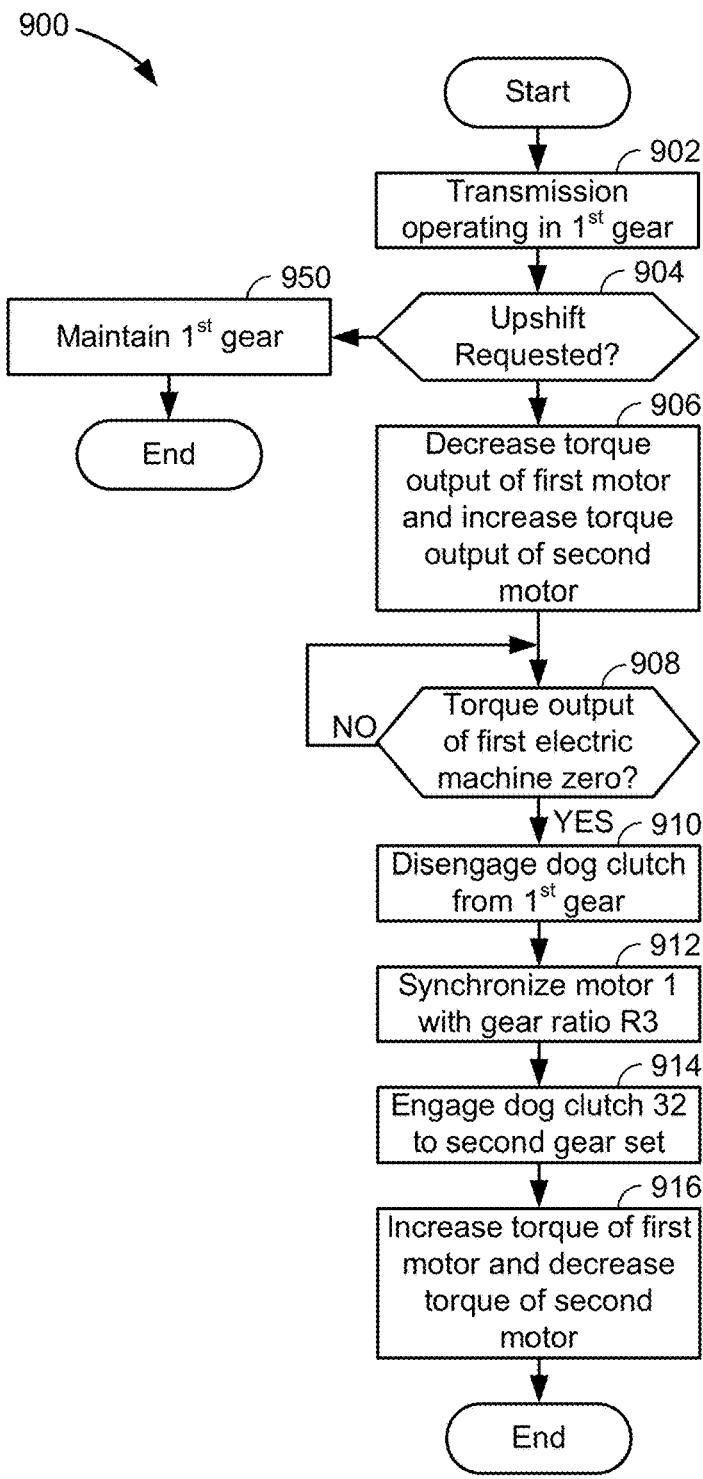
FIG. 9 shows a flowchart of a method for shifting a transmission.

In the following, a control method for controlling the transmission unit of FIG. 1 to perform a gear shift from the first gear set 12, 13 to the second gear set 14, 15 is described. A flowchart of the method is shown in FIG. 9. At least portions of method 900 may be included in and cooperate with a system as shown in FIG. 1 as executable instructions stored in non-transitory memory. The method of FIG. 9 may cause the controller to operate actuators in the real world and receive data and signals from sensors described herein when the method is realized as executable instructions stored in controller memory.

At 902, the beginning of the shifting process, the transmission unit is in first gear, where the second electric motor 2 is driving via the third gear set 22, 23 together with the first electric motor 1 via the first gear set 12, 13 and closed first dog clutch 31. Method 900 proceeds to 904, where method 900 judges if a transmission upshift is requested. If so, method 900 proceeds to 906. Otherwise, method 900 proceeds to 950. At 950, method 900 maintains the transmission in first gear. Method 900 proceeds to exit after the transmission is maintained in first gear.

At 906, the first electric motor 1 is controlled to decrease the first torque T1 to zero. Simultaneously, while meeting driver demand torque, the second electric motor 2 is controlled to increase the second torque T2 to fully or partially compensate the decrease of the first torque T1. Method 900 proceeds to 908. At 908, method 900 judges if the output torque of the first electric machine is zero. If so, the answer is yes and method 900 proceeds to 910. Otherwise, the answer is no and method 900 returns to 908. At 910, the first dog clutch 31 is controlled to disengage from the first gear set 12, 13. Method 900 proceeds to 912. At 912, the first electric motor 1 is controlled to synchronize with gear ratio R3, i.e. with the second dog clutch 32 which is rigidly connected to the transmission output shaft 30. For example, the speed of electric motor 1 is controlled such that speed of gear 15 is equal to the speed of dog clutch 32. Method 900 proceeds to 914.

At 914, the second dog clutch 32 is controlled to engage with the second gear set 14, 15 when the first electric motor 1 has been synchronized. Method 900 proceeds to 916. At 916, the first electric motor 1 is controlled to increase the first torque T1, and, simultaneously, the second electric motor 2 is controlled to decrease the second torque T2 while meeting driver demand torque. Method 900 proceeds to exit.

At low transmission output speed Wout, the first dog clutch 31 engages the first gear set 12, 13 with gear ratio R1, therefore a transmission output torque Tout is:

$$T_{out}=R2T2+R1T1,$$

where T1 and T2 are output torques generated by the electric motors 1 and 2, respectively. At high transmission output speeds, the second gear set 14, 15 with ratio R3 is engaged via the second dog clutch 32, and the transmission output torque is:

$$T_{out}=R2T2+R3T1$$

Given the transmission output speed Wout, the speeds of the two electric motors 1, 2 are:

W1=Rx Wout with Rx=R1 or R3, depending on the dog clutch position 31, 32

W2=R2 Wout

Figure 3:
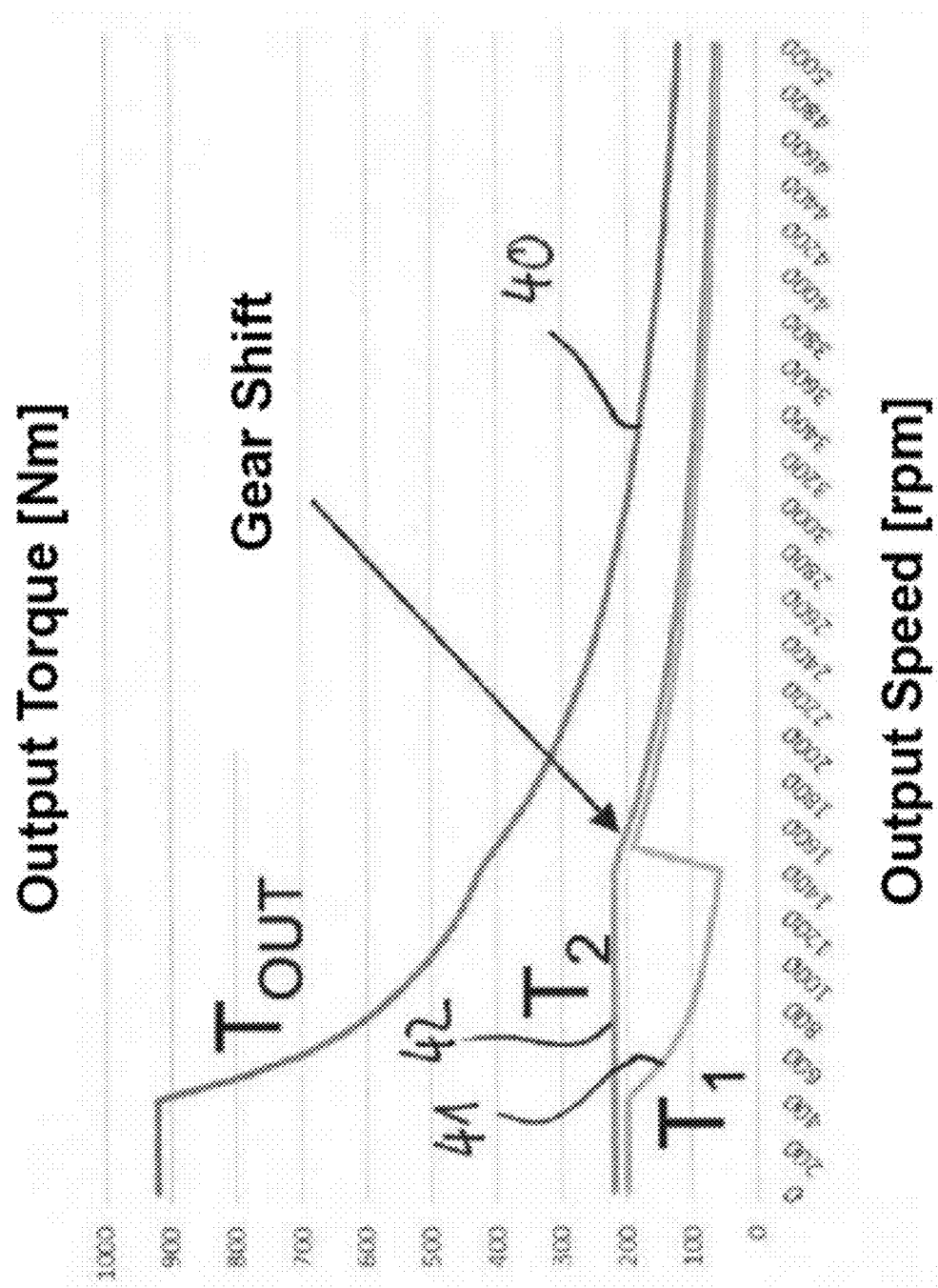
FIG. 3 shows a diagram depicting an output torque curve depending on the output speed during a gear shift according to an embodiment of the present disclosure.
Figure 4:
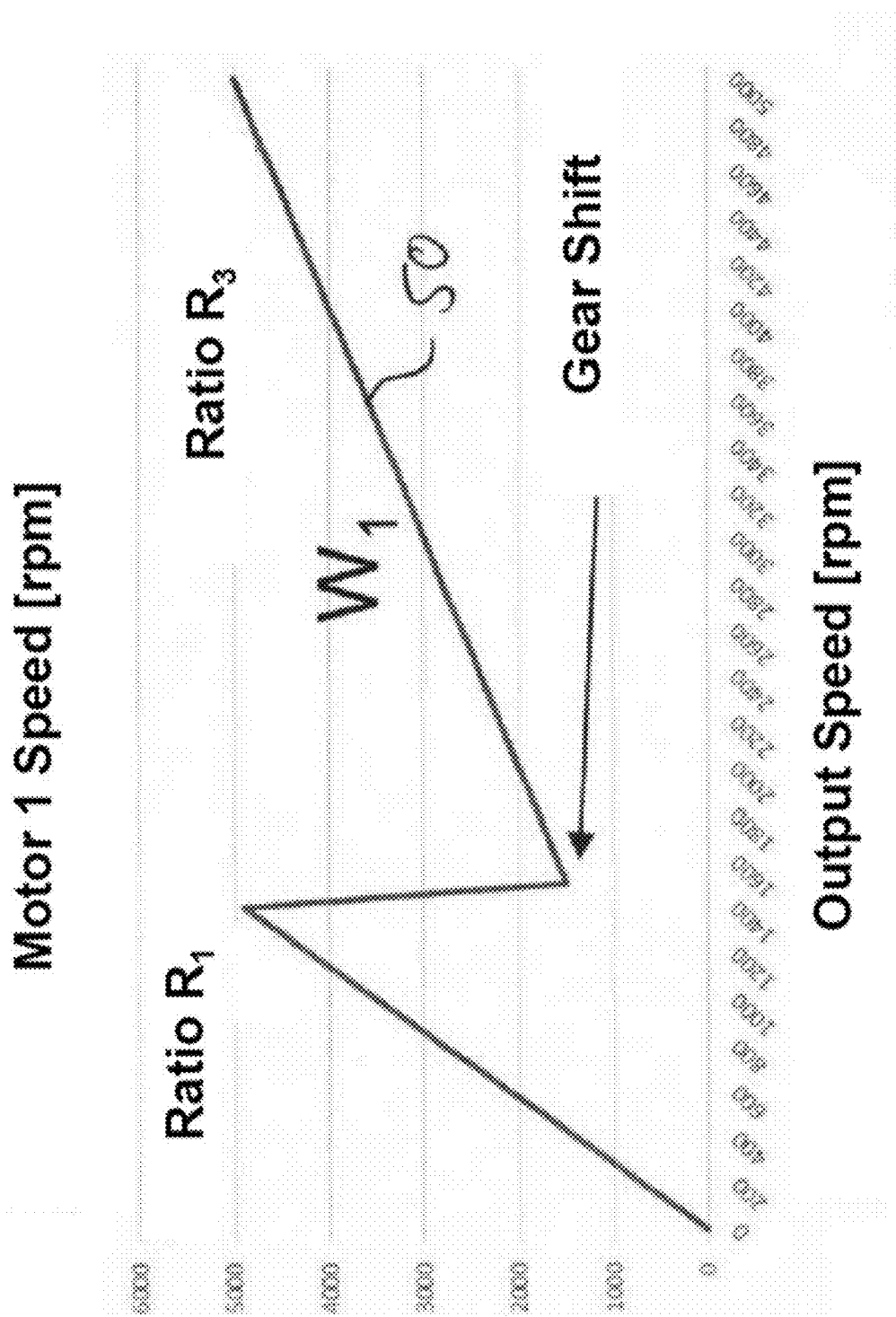
FIG. 4 shows a diagram depicting a speed curve of the first electric motor depending on the output speed during a gear shift according to an embodiment of the present disclosure.

The equations above are represented in FIGS. 3 and 4.

FIG. 3 shows a diagram depicting continuous output torque curves depending on the output speed during a gear shift according to an embodiment of the present disclosure. Curve 41 depicts the output torque of the first electric motor 1, curve 42 depicts the output torque curve of the second electric motor 2 and curve 40 depicts the transmission output torque of the transmission output shaft 30. At the speed of the gear shift, T1 decreases while T2 remains basically continuous. At the point where T1 is zero, T2 is increased strongly for a short period. However, this is not shown in FIG. 3, but in FIG. 5. The short increase of T2 enables a continuous transmission output torque Tout across the gear shift.

FIG. 4 shows a diagram depicting a speed curve 50 of the first electric motor 1 depending on the output speed during a gear shift according to an embodiment of the present disclosure. At the gear shift, the speed curve 50 of the first electric motor 1 has a minimum which complies basically with the speed of the second dog clutch 32 at synchronization of electric motor 1.

Figure 5:
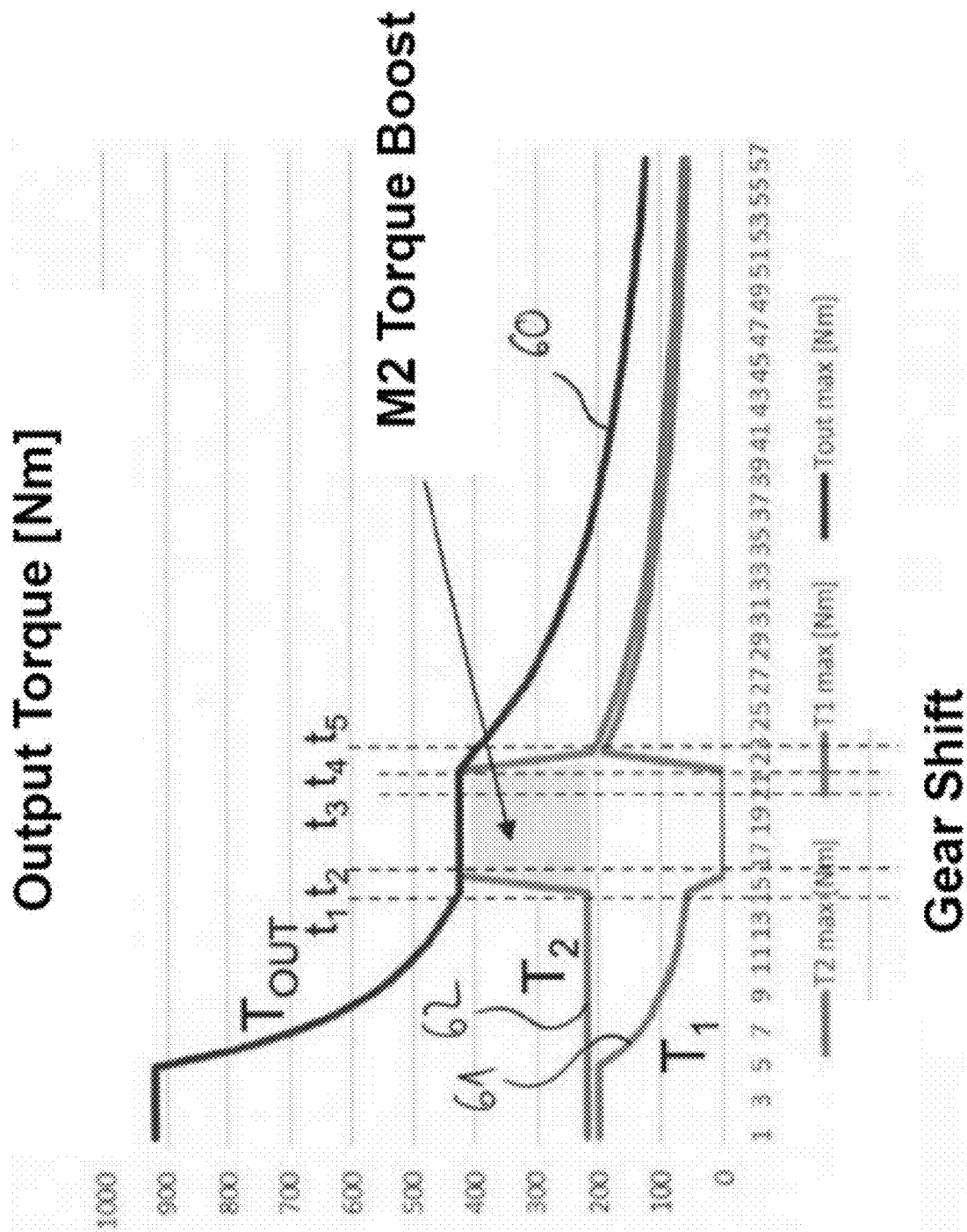
FIG. 5 shows a diagram depicting an output torque curve depending on time during a gear shift according to an embodiment of the present disclosure.

FIG. 5 shows a diagram depicting output torque curves depending on time during a gear shift according to an embodiment of the present disclosure. Curve 61 represents the first output torque T1 of motor 1, curve 62 represents the second output torque T2 of motor 2 and curve 60 represents the transmission output torque Tout. At the time of zero torque T1, torque T2 is increased for a short period as long as T1 is zero by a torque boost. This torque boost of the second electric motor 2 compensates the zero torque of the first electric motor 1 and ensures a continuous transmission output torque Tout during the gear shift.

Figure 6:
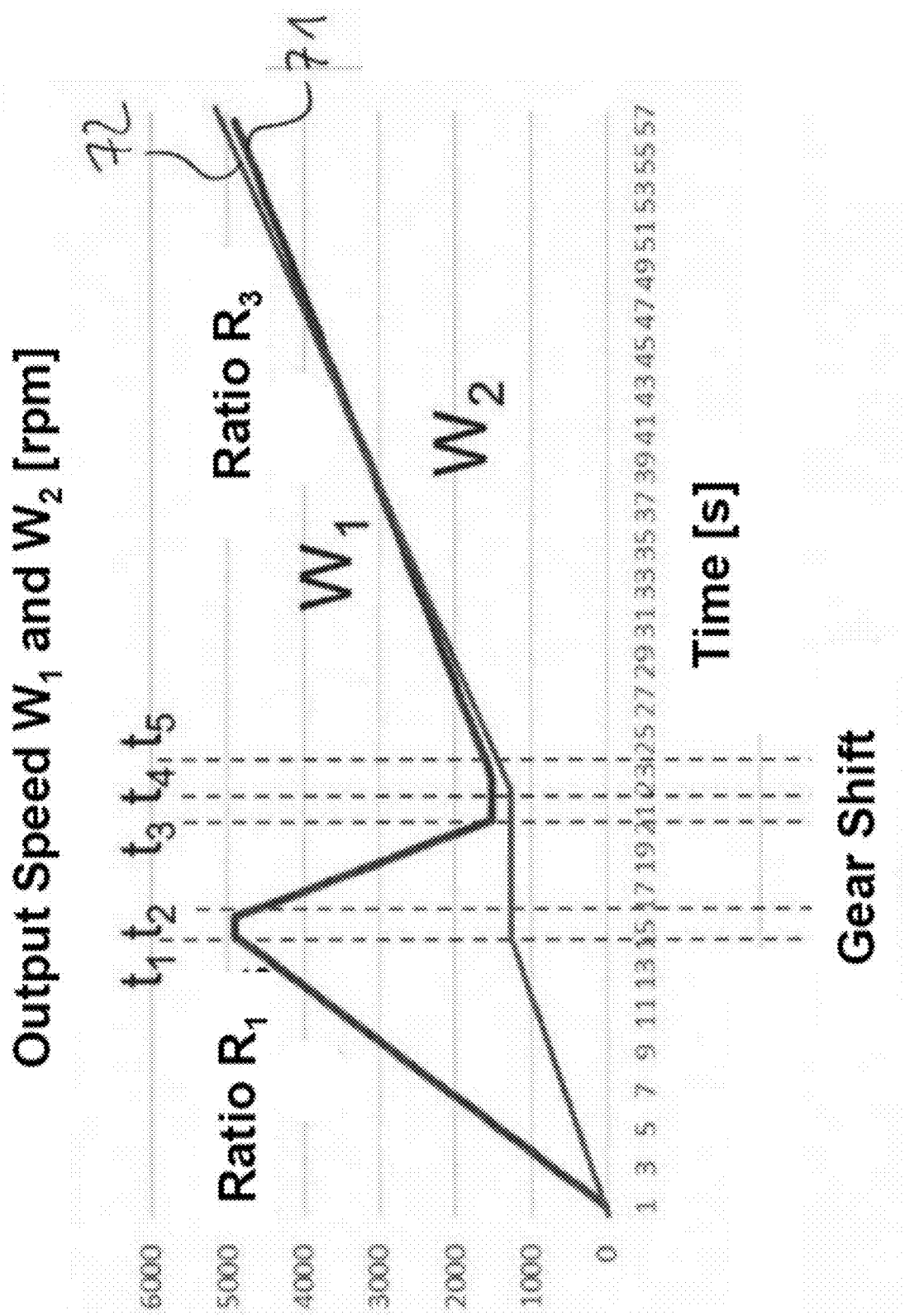
FIG. 6 shows a diagram depicting speed curves of the first and second electric motor depending on time during a gear shift according to an embodiment of the present disclosure.

FIG. 6 shows a diagram depicting speed curves of the first and second electric motor 1 and 2 depending on time during a gear shift according to an embodiment of the present disclosure. Curve 71 represents the speed W1 of the first electric motor 1 during the gear shift. Curve 72 represents the speed W2 of the second electric motor 2 during the gear shift.

FIGS. 5 and 6 show details of the gear shift (which is an upshift here), when the gearbox is delivering the maximum continuous torque from 0 to max rpm. The time scale is not actual, it has been enlarged around the gear shift to improve the graphical representation.

It is well known that the peak torque of an electric motor is much higher than the continuous torque, a normal value ranges from +20% to +100% depending on the technology and on the cooling system. This feature will be exploited during the gear shift to make it smooth by ensuring output torque continuity.

The electric motors 1, 2 are equipped with angular position sensors 16 and 24. The position sensors are used by the inverter to properly control the electric motors 1, 2. The angular position information is then available, and it is used to control the dog clutch engagement.

In FIGS. 5 and 6, the gear shift is between time t1 and t5. In the following, the upshift sequence of a specific embodiment as already described above is described again with respect to FIGS. 5 and 6. At time t1, the first electric motor 1 is close to its top speed, the operator is still asking to increase the speed, the upshift operation starts. Between t1 and t2, motor 1 decreases its torque to zero, at the same time, by exploiting the possibility of a torque boost, the second electric motor 2 increases its output torque to fully compensate the lower torque from motor 1. This operation renders the output torque continuous. At t2 the torque T1 is zero, the dog clutch 31 can be moved to neutral. Between t2 and t3, dog clutch 31 and dog clutch 32 are in neutral. Motor 1 goes in position control mode in order to reach the target position that ensures a seamless engagement of dog clutch 32. It is important to note that this phase can last for many seconds if needed as the electric motor 2 is supplying all the torque needed to maintain the output torque continuity. At time t3, motor 1 has reached the target angular position. Between t3 and t4, motor 1 continues to follow the position target to allow dog clutch 31 to engage R3. Ideally, as the position control is active, dog clutch 32 is engaged but no torque is transmitted to the transmission output shaft 30. At t4, dog clutch 32 is completely engaged. Between t4 and t5 the motor 1 delivers back torque and motor 2 reduces its output torque and exits the "boost" mode. At t5 the gear shift operation ends. Conceptually, the very same sequence applies during a downshift operation.

If the gearshift takes a short time (<1 s), the torque requested by the vehicle can be considered to be constant. One feature of this disclosure is the possibility to have longer gear shifts (e.g. 5 s) in order to make use of very simple and cost-effective dog clutches. During a long gear shift, the torque is still continuous and motor 2 provides the torque requested by the vehicle/operator.

From a control viewpoint, the above sequence is obtained by controlling motor 2 to follow a speed reference (e.g. based on the requested vehicle speed), whereas motor 1 follows either a torque reference or a position reference when in neutral. By this way, the boost mode between t1 and t2 enters "automatically" since, to keep the requested speed, motor 2 has to increase its output torque to compensate the reduction in T1. Similarly, between t4 and t5, when motor 1 delivers more torque after the gear shift, motor 2 can "automatically" exit from the boost mode.

Efficiency Optimization

Figure 7:
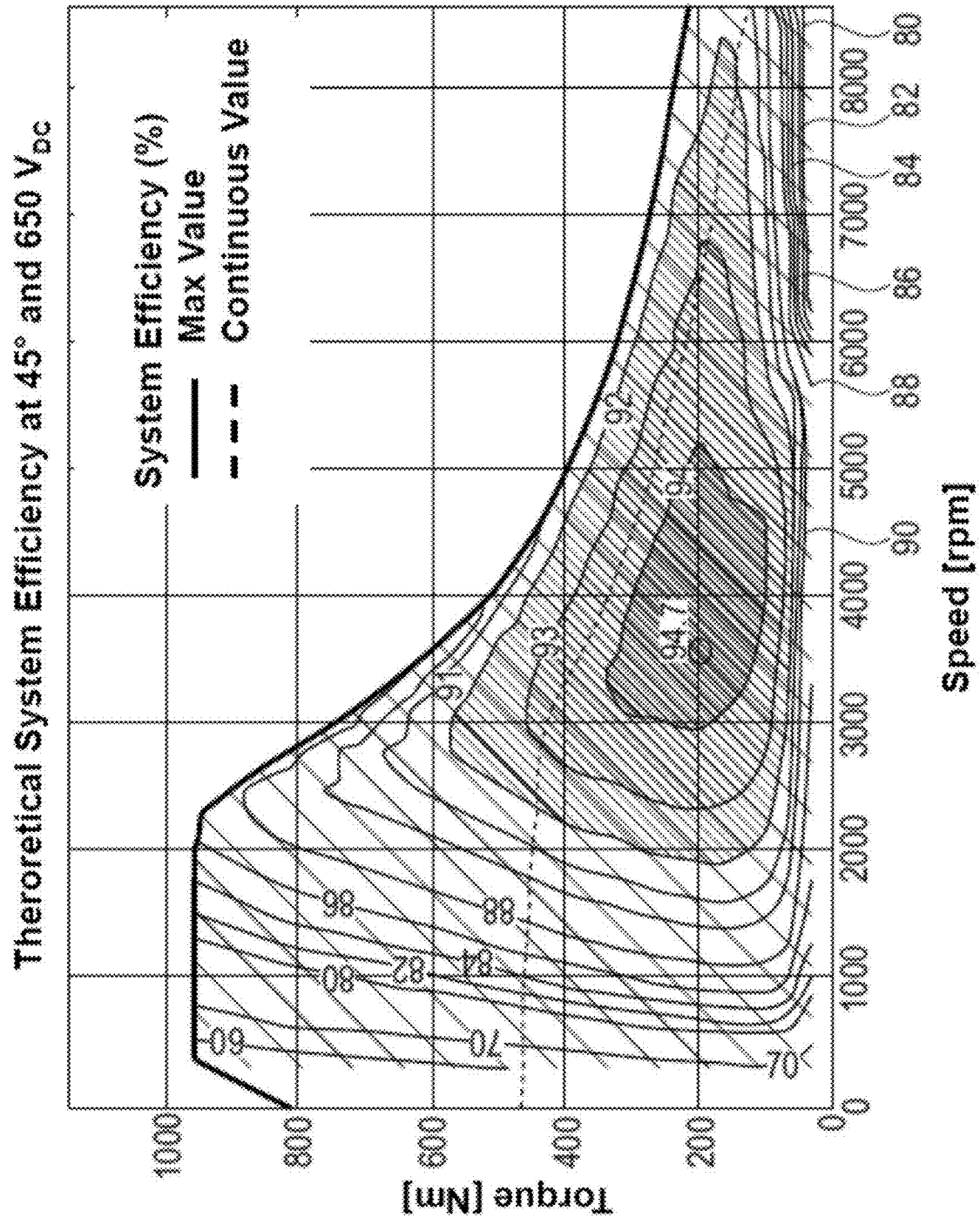
FIG. 7 shows an example of an efficiency map of an inverter-motor system.

When the maximum output torque is not needed, the two equations $$Tout=R2T2+R1T1 \text{(mode 1, low speed)}$$

$$Tout=R2T2+R3T1 \text{(mode 2, high speed)}$$

allow to decide how much of the output torque is delivered by the first electric motor 1 and by the second electric motor 2. As the efficiency maps of the motors are known (see FIG. 7 as an example), for each operating point of the transmission, the torque delivered by the two motors 1, 2 is chosen to maximize the overall efficiency.

Ideal Sizing and Benefits

Figure 8:
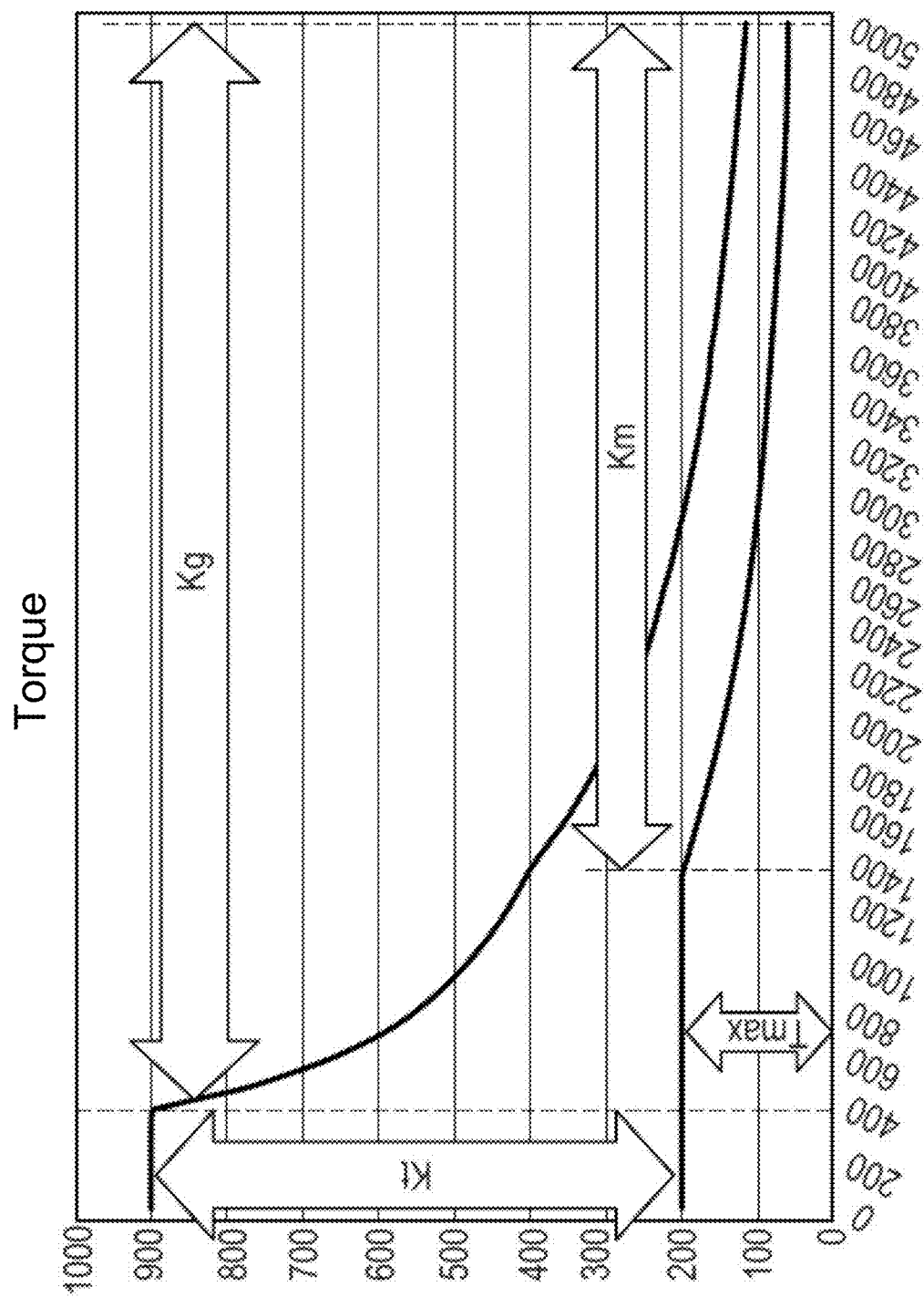
FIG. 8 shows a diagram illustrating an ideal sizing of a transmission unit according to an embodiment of the present disclosure.

Referring to FIG. 8, given an electric motor with parameters Km and Tmax, assuming R2=1 (without affecting the general conclusion), the best choice for R1 and R3 is:

$$R1=Km=Wmax/Wc$$

$$R3=R2=1$$

By this choice, the overall transmissionx is similar to a single electric motor with:

$$Tgmax=Tmax+KmTmax=(1+Km)Tmax=KtTmax$$

$$Kt=1+Km$$

$$Kg=Km^2$$

The very high torque at low speed together with the high ratio Kg makes this transmission suitable to vehicles with low voltage power supply, high tractive effort and high speed (>20 kph).

It is clear that any combination with a chosen value of R2 and:

$$R1=KmR2$$

$$R3=R2$$

has the same properties, just proportional in terms of output speed and torque.

Summarizing, starting from two equal motors characterized by Tmax and Km, with the proposed transmission an equivalent motor can be obtained characterized by (1+Km)Tmax and $Km^2$, respectively.

The invention claimed is:

1. A transmission unit for an electric vehicle comprising:
   a transmission output shaft;
   a first electric motor having a first output shaft that can be coupled with the transmission output shaft via a first or a second gear set, wherein a first clutch element is arranged between the first gear set and the transmission output shaft and a second clutch element is arranged between the second gear set and the transmission output shaft, an output angular position of the second clutch element being rigidly and directly connected to the transmission output shaft;
   a second electric motor having a second output shaft coupled with the transmission output shaft via a third gear set;
   a first angular position sensor to detect an angular position of the first electric motor, a second angular position sensor to detect an angular position of the second electric motor; and
   a controller configured to control the first and second electric motors and to perform a gear shift, wherein the output angular position of the second clutch element is determined and monitored using the second angular position sensor.

2. The transmission unit according to claim 1, wherein the first and second clutch elements comprise or consist of dog clutches, wherein the controller is further configured to, when the first electric motor is decoupled from the transmission output shaft including during a gear shift process, control the first electric motor to synchronize with the output angular position of the second clutch element by controlling an angular position of a gear of the third gear set in accordance with the output angular position of the second clutch.

3. The transmission unit according to claim 1, wherein the controller is configured to synchronize the first or second electric motor with a next gear ratio and to engage or disengage the first or second clutch element when the first or second motor has been synchronized.

4. The transmission unit according to claim 3, wherein the controller is adapted to synchronize the first and second electric motors using the detected angular positions of the first and second electric motors.

5. The transmission unit according to claim 3, wherein the controller is configured to control the first and second electric motors and the first and second clutch elements such that a transmission output torque of the transmission output shaft is constant during a gear shift.

6. The transmission unit according to claim 1, wherein the first and second clutch elements are spring applicable and/or hydraulically releasable.

7. The transmission unit according to claim 1, wherein the first and second electric motors are connected to a common cooling system to share a thermal load produced during operation of the first and second electric motors.

8. A control method for controlling a transmission unit to perform a gear shift from a first gear set to a second gear set, both gear sets coupled to a transmission output shaft, comprising:
controlling a first electric motor to decrease a first torque to zero;
controlling a second electric motor to increase a second torque to fully or partially compensate the decrease of the first torque;
controlling a first clutch element to disengage from the first gear set when the first torque is zero;
controlling, when the first electric motor is decoupled from the transmission output, the first electric motor to synchronize with a gear ratio of the second gear set;
controlling a second clutch element to engage with the second gear set when the first electric motor has been synchronized with the gear ratio of the second gear set;
controlling the first electric motor to increase the first torque; and
controlling the second electric motor to decrease the second torque, wherein an output angular position of the second clutch element is rigidly and directly connected to the transmission output shaft, and wherein the output angular position of the second clutch element is sensed using an angular position sensor of the second electric motor, and an input angular position of the second clutch element is sensed using an angular position sensor of the first electric motor.

9. The control method according to claim 8, wherein the second electric motor is controlled according to a vehicle speed reference.

10. The control method according to claim 8, where the synchronizing includes equalizing speed of the second gear set and a speed of the second clutch element.

11. The control method according to claim 10, where the second clutch element is a dog clutch.

12. The control method according to claim 8, where the first clutch element is a dog clutch.

13. The control method according to claim 8, where the transmission unit is controlled via a controller.

* * * * *